Patented June 29, 1937

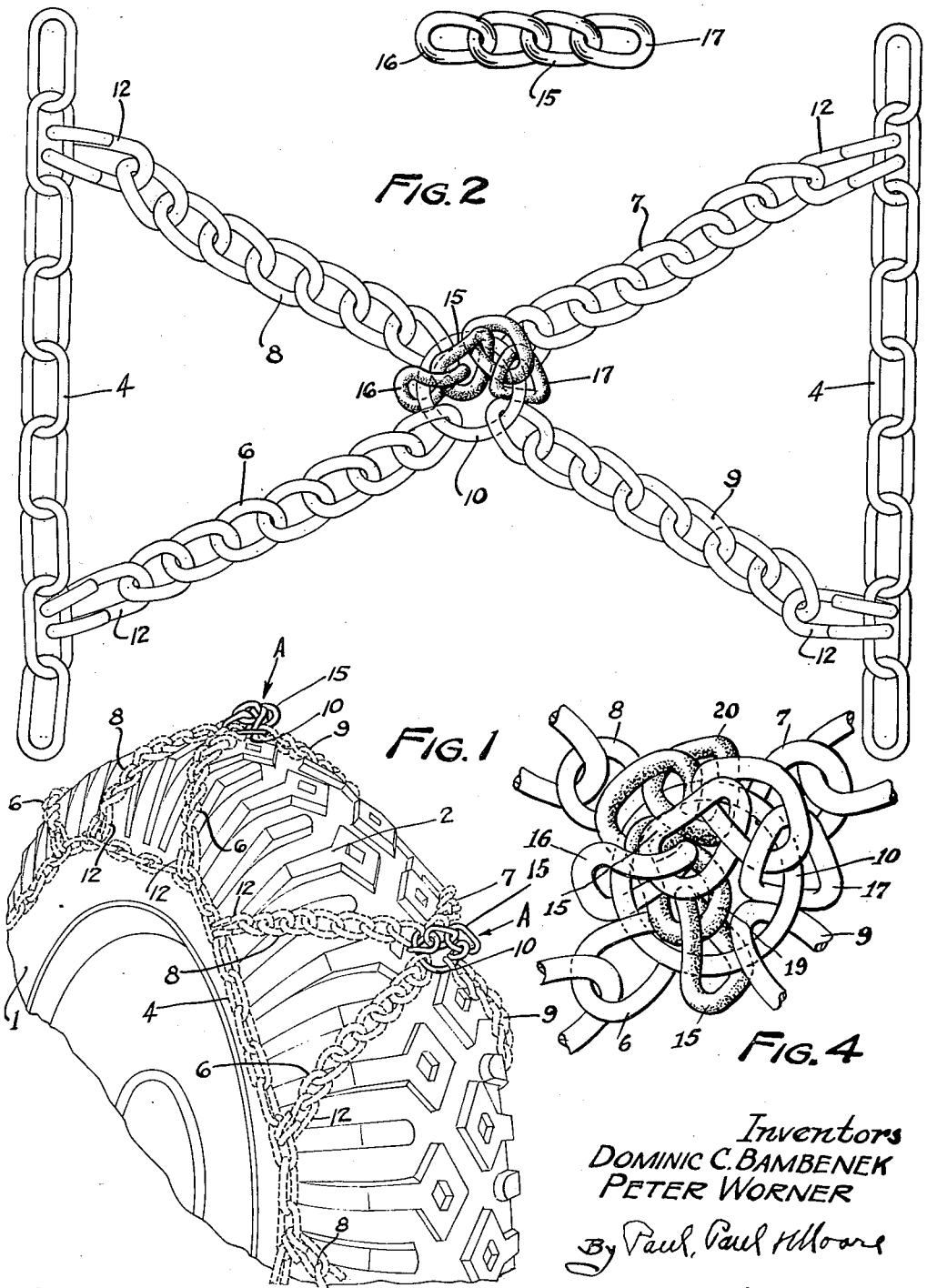

2,085,288

UNITED STATES PATENT OFFICE 2,085,288

TIRE CHAIN

Dominic C. Bambenek and Peter Worner, Winona, Minn., assignors to Peerless Chain Company, Winona, Minn., a corporation of Minnesota Application September 30, 1936, Serial No. 103,346

10 Claims. (Cl. 152—14)

This invention relates to improvements in non-skid chains or emergency chains, for automobile wheels, and has for an important object to provide traction-increasing means of the character later described, which is particularly effective for increasing traction in mud of various kinds, such as is encountered on farms, for example. The invention has found valuable use on farm tractors.

We are aware that there have been various attempts to produce an efficient chain particularly for use on farm tractors, but thus far, in so far as we are aware, other devices have not been worth while. These chains are generally of the weed type or are modifications of that type, and although we claim application of our invention to that type of chain the invention is not entirely limited thereto, because the bunching or knobbing conception broadly, as well as the bunching of chain links in particular, to form traction knobs, is believed to be new in this art.

Various schemes have been tried, extra chains have been used on the cross chains to double their cross-sectional area, and these have extended in parallel relation with the cross chains. Such devices do not greatly increase traction. Connecting links have been used with an attempt to have them project at the middle of the tire but such links have been found inadequate to increase traction to the extent needed for farm uses.

One type of emergency chain in which this invention has been particularly successful is that in which the cross chains are diagonally arranged with reference to the longitudinal circumference of the tire, or wheel. In this well known type of chain there are employed two parallel laterally arranged chain members or their equivalents, and cross connecting these lateral chains are diagonal chains above referred to. The disadvantages of all cross chains known to us is that they have a tendency to pull taut on the tire and become very set and rigid, with the result that any mud which they pick up sticks to the chain and very much decreases, and at times substantially entirely destroys the traction ability. At any rate the traction ability is so greatly reduced as to be inadequate under many conditions of use, required of these chains. This is particularly true when running a tractor in slippery mud, like gumbo or clay.

Our invention virtually consists in providing a plurality of chain links (or elements which for our broad purpose are their functional equivalent) which are so disposed or arranged as to be capable of sliding upon one another and of piling to project at different angles to form knuckles comparable to those of a closed hand or fist, and which together form a bulging knob. These links are free to swing or flop to obtain self-cleaning. In the present embodiment this bunching of slack chain is made to take place at and in a ring acting as a connector for the ends of four diagonal chain sections. The use of the bunched chain with this ring (or at the apical portion of the tire, in case the ring is not used) gives added height and provides a series of circumferentially spaced knobs which are self-adjustable and not fixed, and which give a very deep bite into mud, and which are self-cleaning.

These "mats" or diagonal cross chain types of emergency units are ordinarily used on tires, the treads of which are provided with prominent projections generally disposed so that if it were not for the diagonal disposition of the cross chains, these chains would enter between the projections to project little if at all and thus be ineffective as traction increasing elements. The tire manufacturers are trying to give the tires maximum traction by reinforcing the treads by such projections, which in some respects resemble the old steel type of lugs. These molded tire projections are inadequate for farm use without chains, and all of the chains known to us either enter into the grooves or depressions of these ribbed tires or for one reason or other fill up with mud and become more slippery than ever.

Features of the invention include all details of construction shown, along the broader ideas of means inherent in the disclosure. We believe ourselves to be the first to bunch a flexible self-cleaning chain, or functionally equivalent device, no matter where and how located, for the purpose of increasing traction.

Objects, advantages, and features of the invention will appear in the description of the drawing forming part of this application, and in said drawing:

Figure 1 is a perspective view showing our device applied to a weed type of diagonal cross chain and showing the bunching action;

Figure 2 is a plane view, of a portion of the chain of Figure 1;

Figure 3 is a plane view of Figure 1 of one of our flexible bunchable traction increasing units; and Figure 4 is a somewhat diagrammatic view showing the application of two flexible traction increasing chain units to a connector ring, arranged in diametric relation to one another.

Referring first to Figures 1 and 2, the tire is generally indicated at 1 and has the usual raised tread reinforcement generally indicated by the numeral 2. Disposed at the sides of the tire are the usual circumferential strands 4 which are usually chains. They may of course be of any suitable material. Cross connecting these strands 4 are pairs of chain lengths, two pairs of which may be said to constitute a unit, the members of one pair being designated by the numerals 6, 7, and the members of the other pair by numerals 8, 9. A ring 10 lies at the circumferential middle or apex of the tire when the chain is attached, and to this ring the ends of the chain sections 6, 7, 8, and 9 are suitably attached. The outer end of each chain has a suitable hook link generally indicated at 12 connecting with the elongated links of side chains 4, as shown. The chain sections 6, 7, 8, and 9, are preferably of the twisted type.

Our invention includes the use of a short length of chain in this embodiment (but not necessarily in all) composed of four links, generally indicated at 15. The links, whatever their number, are preferably twisted. The end links 16 and 17 of this chain length are respectively connected at opposite sides of the ring as shown in Figure 2 and the proportioning of the length of the link sections 15 to the diameter of the ring 10 is such as to allow the links to move, slide and adjust themselves and be capable of bunching or knobbing under all conditions, at or immediately adjacent the center of the ring, or therewithin.

It is to be understood that we do not limit ourselves entirely to the character of the chain links, or even to the use of chain links at all; nor to the connection of the links with the ring as distinguished from their direct connection with the cross chain elements at the meeting point of these elements. It is conceivable that these links or other bunchable elements may be used at other locations on the cross chains, may even be used on a single cross chain, and although they have not been so shown, their use in other positions is contemplated.

We have thus provided bunches or knobs, which also have a flopping action for self-cleaning, and which form projections, such as indicated at "A" in Figure 1, which are of relatively great depth and which very substantially increase the tractive ability of each cross chain.

In Figure 4 a modification is shown in which two bunchable flexible chain lengths 15 and 19 are used. In this case the end links 16 and 17 of length 15 are connected to the ring at points between the ends of cross chains 6, 8, and 7, 9, respectively, and the end links 20, 21 of the chain length 19 are connected to the ring between the ends of cross chains 7, 8 and 6, 9 respectively. The sections 15 and 19 are thus crossed. This feature of the invention is claimed per se, along with the broader ideas of self-adjustable knob-forming traction increasing means.

When we use the expression "knob" or "bunch" or "bunched", we mean to distinguish over old types of traction increasing elements, which are not capable of adjusting themselves to form a very prominently outstanding somewhat circumscribed knob and which are not self-cleaning. We are aware that chains have been used to reinforce cross chains, to double the chain thickness, by adding a parallel strand in parallel relation with the cross chain and connected by its ends to the cross chain, but these added chains have not been successful, cannot bunch or adjust themselves, and are incapable of self-cleaning.

In applicants' preferred form the distance between the points of attachment of the traction increasing chains with the ring, is substantially greater than the diameter of the ring to allow slippage of one link on another, and to allow bunching or piling. For example, in one embodiment, which is now in use, a twisted link chain is used, and the overall length of each link is about two inches. Four links are used and the end elements of this group of four links are connected in diametric relation to a ring whose outside diameter is about two and five-eighths inches. The cross sectional diameters of the links and the ring are about the same being approximately three-eighths of an inch.

It is readily seen that the overall length of the group of four links when attached to the ring is sufficient to allow these links to assume various positions, and when assuming such positions to overlap and shift longitudinally and twist at different angles so that the final result is always bunching, whether within or outside of the ring. The use of the ring is a valuable feature, since it forms a kind of receptacle, the bottom of which is formed by the tire, and which acts to localize the bunching action, and to prevent undue spreading of the links. This bunching and knob-like formation, circumscribed to some extent as it is by the ring, is a very important feature of the invention and in so far as we are aware, no one has discovered exactly what was needed. On the other hand, each link of the chain connected to the ring is capable of twisting and turning in various directions, moving longitudinally and rubbing one against the other thus accomplishing self-cleaning. Of course, we do not limit ourselves to the exact measurements given, but merely illustrate that the links are so arranged to be able to adjust themselves and to bunch.

When we speak of "emergency chains" or of "Weed type chains" we do not mean that our invention is limited to use on any particular type of chain although the preferred application is to the crossed-chain type. Our invention can be applied to any kind of chain, although we have also claimed its application specifically to the type illustrated in Figure 1, as giving particularly desirable results on muddy terrain. It is to be understood that the bunched self-cleaning chain scheme can be applied to any type of cross chain to increase traction.

We claim as our invention:

1. A traction increasing device for wheels, having flexible traction increasing cross elements said cross elements having flexible means associated therewith in bunched but loose self-cleaning relation, to form prominent outstanding knob-like projections which act to substantially increase the tractive ability of the cross elements when the device is in use.

2. An emergency traction increasing device for wheels, including a cross chain having flexible means connected thereto in bunched but loose relation to form an outstanding knob which acts to substantially increase the tractive ability of the cross chain.

3. An emergency chain including diagonally arranged cross chains having lengths of slack chain connected thereto, each slack chain length being capable of assuming a piled-link condition to form an outstanding flexible knob.

4. An emergency chain including a ring as a connector for pairs of diametrically related cross chain lengths, and a length of slack chain cross connected to the ring, and capable of assuming a link-piled condition within the ring.

5. In an anti-skid chain of the weed type in which lengths of diagonally arranged cross chains are connected by a ring, a short length of chain having its terminal links connected to diametrically opposite portions of said ring, said chain being of a length to allow for bunching or knobbing action of the chain when in use.

6. In an anti-skid chain of the weed type, a length of chain connected to a cross chain to lie at the circumferential middle of the tire when the device is applied, said chain length being so arranged as to bunch when in use, and to form a knob of piled links which constitutes a flexible digger for increasing traction power of the cross chain.

7. In a weed chain of the diagonal cross chain type in which the cross chains are connected by rings, chain lengths for the rings each so disposed as to form a self-cleaning prominently outstanding flexible knob for increasing the traction ability of the cross chain.

8. In a weed chain of the diagonal cross chain type in which the cross chains are connected by rings, chain lengths cross connecting opposite sides of the rings, the distance between the points of connection of the chain with rings being so much greater than the diameter of the rings that the chains can bunch and pile when in use to form prominently outstanding digger or traction increasing knobs.

9. An anti-skid chain for automobile wheels having cross chains connected by rings and chain lengths connected to said rings in a manner to slide upon one another to bunch and form a pile of links, which may be within the rings and when within them adapted to prominently project at various angles outwardly therefrom in a manner to substantially increase the tractive ability of the cross chains.

10. A ring as a connector for sections of traction increasing cross chains for wheels, having attached thereto a length of slack chain capable of assuming link-piled condition within the ring, to provide an outstanding knob-like traction increasing projection.

DOMINIC C. BAMBENEK.
PETER WORNER.